US012544296B2

(12) United States Patent
Bukharina et al.

(10) Patent No.: US 12,544,296 B2
(45) Date of Patent: Feb. 10, 2026

(54) THERAPEUTIC APPARATUS AS AN EXPANDABLE PRESSURE POINT MAT COMPRISING PRESSURE POINT FINGERS TO TARGET HUMAN TISSUE AREAS TO RELIEVE PAIN AND PROVIDE THERAPEUTIC TREATMENT

(71) Applicants: Anya Bokeria, Austin, TX (US); Roger Borbon, Austin, TX (US); Nathali Parker Weisman, Austin, TX (US)

(72) Inventors: Galina Bukharina, Austin, TX (US); Roger Borbon, Austin, TX (US); Nathali Parker Weisman, Austin, TX (US)

( * ) Notice: Subject to any disclaimer, the term of this patent is extended or adjusted under 35 U.S.C. 154(b) by 787 days.

(21) Appl. No.: 17/967,282

(22) Filed: Oct. 17, 2022

(65) Prior Publication Data

US 2023/0044036 A1 Feb. 9, 2023

Related U.S. Application Data

(63) Continuation-in-part of application No. 17/958,913, filed on Oct. 3, 2022, now abandoned, which is a (Continued)

(51) Int. Cl.
*A61H 7/00* (2006.01)
*A61H 39/04* (2006.01)

(52) U.S. Cl.
CPC ............. *A61H 7/001* (2013.01); *A61H 39/04* (2013.01); *A61H 2201/0107* (2013.01);

(Continued)

(58) Field of Classification Search
CPC .......... A61H 7/00; A61H 7/001; A61H 7/002; A61H 7/007; A61H 7/008;

(Continued)

(56) References Cited

U.S. PATENT DOCUMENTS 658,789 A * 10/1900 Legg .................... A47C 31/105 5/500
1,982,516 A * 11/1934 Holmested ............. B60N 2/707 297/452.45

(Continued)

FOREIGN PATENT DOCUMENTS

DE 3404528 8/1985
KR 200313134 Y1 * 5/2003 ............. A61H 39/04

(Continued)

OTHER PUBLICATIONS

English translation of DE3404528, Espacenet.com, Aug. 2, 2016.

*Primary Examiner* — Tu A Vo
(74) *Attorney, Agent, or Firm* — HULSEY P.C.

(57) ABSTRACT

A therapeutic apparatus for providing a therapeutic treatment. The therapeutic apparatus includes mats. Each mat includes first pressure point fingers. Each first pressure point finger extends from the surface of the mat. The therapeutic apparatus includes a connector connecting the mats. The connector includes second pressure point fingers. The second pressure point fingers have a similar construction to the first pressure point finger. The mats position side-by-side with the help of the connector exposing the first pressure point fingers of each adjacent mat and the second pressure point fingers of the connector providing a continuous array of pressure point fingers. A user rests over the first pressure point fingers and the second pressure point fingers for applying pressure to targeted areas of human tissue to relieve pain and get therapeutic treatment.

10 Claims, 13 Drawing Sheets

Related U.S. Application Data continuation of application No. 14/828,490, filed on Aug. 17, 2015, now abandoned.

(60) Provisional application No. 63/257,061, filed on Oct. 18, 2021.

(52) U.S. Cl.
CPC ................ *A61H 2201/0134* (2013.01); *A61H 2201/0157* (2013.01); *A61H 2201/0161* (2013.01); *A61H 2201/1284* (2013.01); *A61H 2201/168* (2013.01); *A61H 2201/1695* (2013.01)

(58) Field of Classification Search
CPC .. A61H 2007/009; A61H 39/00; A61H 39/04; A61H 2201/16; A61H 2203/0443; A61H 2203/0456; A61H 2205/08; A61H 2205/081; A61H 2201/0107; A61H 2201/1695; A61H 2201/1692
See application file for complete search history.

(56) References Cited

U.S. PATENT DOCUMENTS

| | | | | | |
|---|---|---|---|---|---|
| 1,987,390 | A | * | 1/1935 | Davis | A61H 7/003 15/244.4 |
| 2,476,921 | A | * | 7/1949 | Orvil | A61H 7/001 482/79 |
| 3,028,857 | A | | 4/1962 | Parker | |
| 3,100,483 | A | * | 8/1963 | Altmeyer | A61H 7/001 601/28 |
| 3,284,819 | A | | 11/1966 | Nissen | |
| 3,434,715 | A | * | 3/1969 | Brantingham | A63B 21/4037 482/79 |
| 3,775,785 | A | | 12/1973 | Mittendorf | |
| 3,885,555 | A | | 5/1975 | Nobbs | |
| 4,064,578 | A | * | 12/1977 | Yamada | A61G 5/1045 5/951 |
| 4,095,353 | A | | 6/1978 | Foldes | |
| 4,383,342 | A | | 5/1983 | Forster | |
| 4,421,110 | A | | 12/1983 | Delisle | |
| 4,509,510 | A | * | 4/1985 | Hook | A61H 7/001 601/28 |
| 4,594,829 | A | * | 6/1986 | Herrgord | E05D 1/04 52/282.3 |
| 4,630,323 | A | | 12/1986 | Sage | |
| 4,802,249 | A | | 2/1989 | Bills | |
| D326,362 | S | * | 5/1992 | Bertwell | D30/158 |
| 5,153,956 | A | * | 10/1992 | Nold | A61G 7/05707 428/218 |
| 5,158,073 | A | * | 10/1992 | Bukowski | A61H 39/04 601/28 |
| D344,591 | S | * | 2/1994 | Zhuang | D24/211 |
| D351,235 | S | * | 10/1994 | Yoo | D24/211 |
| 5,384,923 | A | | 1/1995 | Hwang | |
| D356,685 | S | * | 3/1995 | Bertwell | D4/125 |
| D361,132 | S | * | 8/1995 | Lee | D24/211 |
| 5,639,145 | A | | 6/1997 | Alderman | |
| 5,830,163 | A | * | 11/1998 | Obermaier | A61H 7/001 601/134 |
| 5,938,684 | A | | 8/1999 | Lynch | |
| D413,985 | S | * | 9/1999 | Martin | D24/211 |
| 5,970,541 | A | | 10/1999 | Chiang | |
| D435,295 | S | * | 12/2000 | Yoo | D24/200 |
| 6,241,695 | B1 | | 6/2001 | Dabir | |
| D444,550 | S | | 7/2001 | Cobbs | |
| 6,447,865 | B1 | | 9/2002 | Flick | |
| 6,460,306 | B1 | * | 10/2002 | Nelson | E04F 15/04 52/582.1 |
| D471,636 | S | * | 3/2003 | Yu | D24/212 |
| D475,792 | S | * | 6/2003 | Robbins, III | D24/212 |
| 6,763,643 | B1 | * | 7/2004 | M.ang.rtensson | E04F 15/102 52/582.1 |
| 7,481,406 | B2 | * | 1/2009 | Lang | A47F 5/0815 248/220.42 |
| D596,482 | S | * | 7/2009 | Marinucci | D8/394 |
| D603,523 | S | * | 11/2009 | Nan | D24/215 |
| 7,707,654 | B1 | * | 5/2010 | Spence | A61H 7/003 2/163 |
| D639,430 | S | * | 6/2011 | Yoo | D24/146 |
| D693,934 | S | * | 11/2013 | Lin | D24/215 |
| D991,701 | S | * | 7/2023 | Gatskan | D6/592 |
| 2001/0027281 | A1 | * | 10/2001 | Dabir | A61H 7/001 601/134 |
| 2002/0151829 | A1 | * | 10/2002 | Tien | A61H 7/001 601/138 |
| 2004/0139676 | A1 | | 7/2004 | Knauseder | |
| 2004/0204665 | A1 | * | 10/2004 | Chu | A61H 7/001 601/134 |
| 2005/0125901 | A1 | | 6/2005 | Nichols | |
| 2005/0165450 | A1 | | 7/2005 | Perez-Torrens | |
| 2009/0209889 | A1 | * | 8/2009 | Li | A61H 39/04 601/134 |
| 2010/0145244 | A1 | * | 6/2010 | Schwartz | A61H 39/04 601/134 |
| 2014/0088474 | A1 | * | 3/2014 | Bukharina | A61H 7/001 601/134 |
| 2014/0142614 | A1 | | 5/2014 | Gallagher | |
| 2015/0351996 | A1 | * | 12/2015 | Bukharina | A61H 7/001 601/134 |

FOREIGN PATENT DOCUMENTS

| | | | | | |
|---|---|---|---|---|---|
| KR | 20100018272 | A | * | 2/2010 | A61H 39/04 |
| RU | 173284 | U1 | * | 8/2017 | A61H 15/00 |
| RU | 173412 | U1 | * | 8/2017 | A61H 15/00 |
| RU | 177223 | U1 | * | 2/2018 | A61H 15/00 |

* cited by examiner

THERAPEUTIC APPARATUS AS AN EXPANDABLE PRESSURE POINT MAT COMPRISING PRESSURE POINT FINGERS TO TARGET HUMAN TISSUE AREAS TO RELIEVE PAIN AND PROVIDE THERAPEUTIC TREATMENT

CROSS-REFERENCE TO RELATED APPLICATIONS

The present application claims priority from a U.S. Provisional Application Ser. No. 63/257,061, filed Oct. 18, 2021; and which is a continuation-in-part of U.S. non-provisional application Ser. No. 17/958,913, filed Oct. 3, 2022; which is a continuation of U.S. non-provisional application Ser. No. 14/828,490, filed Aug. 17, 2015; all of which are incorporated herein in their entirety and referenced thereto.

FIELD OF INVENTION

The present invention relates to therapeutic apparatuses. More specifically, the present invention relates to a therapeutic apparatus such as an expandable pressure point mat comprising pressure point fingers for applying pressure to targeted areas of human tissue to relieve pain and provide therapeutic treatment.

BACKGROUND OF INVENTION

It is known that prolonged and/or repetitive somatosensory stimulation such as tactile stimulation and electrical stimulation are used as rehabilitation tools. The prolonged and/or repetitive somatosensory stimulation modulates cortical and corticospinal excitability, motor function and sensory skills in both healthy subjects and stroke patients. For example, tactile stimulation such as mechanical tactile stimulation (MTS) activates cortical activity depending on tactile stimulation patterns. The mechanical tactile stimulation is applied using various pressure point devices.

The pressure point devices are used to apply pressure to targeted areas of human tissue to relieve pain and provide therapeutic treatment by applying multiple pressure points to a given area of a body, such as a human body, without penetrating or harming the tissue. As a result, blood flow is increased to the targeted (pressure) area thus stimulating a natural healing effect. Acute inflammation is the body's innate mechanism that "turns on" cellular and tissue repair. In contrast, chronic inflammation overburdens the immune system and therefore is the source of the vast majority of all diseases according to the World Health Organisation (WHO). The multiple pressure points can be provided as protrusions on a supporting mat. The protrusions can be in the form of a selected array of fingers formed of a suitable material. Further, the mat is also used to provide therapeutic treatment to animals.

Generally, the mat having a suitable size to contact an area or a portion of the treated body is used. If required, more mats are placed adjacent to each other (i.e., contiguously connected mats) provides an enlarged area. If the mat is of a relatively large size for contacting a large area of the body, that size may be inconvenient for carrying. If the mat is of a relatively small size, additional mats may be required to engage a targeted treatment area.

Therefore, there is a need in the art to provide a mat which is of a size suitable to be expanded by joining with additional mats, and to be able to join multiple mats by means of a connector which permits one of the mats to be engaged with an adjacent one or more of the mats.

SUMMARY

It is an object of the present subject matter to provide a therapeutic apparatus and that avoids the drawbacks of known pressure point devices.

It is another object of the present subject matter to provide a therapeutic apparatus having pressure point fingers for applying pressure to targeted areas of human tissue to relieve pain and provide therapeutic treatment.

It is another object of the present subject matter to provide the pressure point fingers that apply multiple pressure points to a given area of a body, such as a human body, without penetrating or harming the tissue.

It is yet another object of the present subject matter to provide a mat which is of a size suitable to be expanded by joining with additional mats, and to be able to join multiple mats by means of a connector which permits one of the mats to be engaged with an adjacent one or more of the mats.

In order to achieve one or more objects, the present subject matter presents a therapeutic apparatus having mats. Each mat includes an array of pressure point fingers. Each pressure point finger extends from the surface of the mat. Each pressure point finger includes a base, a shaft and a tip. The base has one of a circular cross-sectional shape, an oval cross-sectional shape, a triangular cross-sectional shape, and a rectangular cross-sectional shape. The shaft tapers outwardly i.e., in a conical configuration from the tip to the base. The tip substantially tapers and includes a rounded edge.

Further, the therapeutic apparatus includes a connector for connecting the mats. The mats position side-by-side with the help of the connector exposing the pressure point fingers of each adjacent mat. A user rests over the pressure point fingers for applying pressure to targeted areas of human tissue to relieve pain and get therapeutic treatment.

In one implementation, the connector includes a first flange and a second flange connected by a web. The first flange and the second flange form a gap on opposing sides of the web for receiving the mats from each side. The second flange includes a rib. Further, each mat includes a groove along the edges. The rib inserts in the groove for locking the mats with the connector.

Additionally, the connector includes second pressure point fingers. The second pressure point fingers have similar construction like the pressure point fingers on the mats. The pressure point fingers on respective mats and the second pressure point fingers on the connector provide a continuous array of pressure point fingers. This enables them to apply pressure to the targeted areas of human tissue to relieve pain and get therapeutic treatment.

In another implementation, each of the mats includes a connecting member. The connecting member includes hooks. Here, the connector includes loops. The loops connect with the hooks for connecting the connector with the mats. Further, the connector allows the mats to fold over one another intersecting the pressure point fingers of respective mats. This allows for easy storage and transport without having to separate the mats when not in use.

In one advantageous feature of the present subject matter, the therapeutic apparatus provides a flexible polyurethane mat with multiple pointed pyramidal spikes, which provide an optimal-strength tactile stimulation. The therapeutic apparatus utilises a non-invasive therapeutic approach and acts as an anti-stress healing applicator without penetration of the skin. This provides an advantage over acupuncture when one or more needles must be inserted to the skin to obtain satisfactory effects.

In another advantageous feature of the present subject matter, the therapeutic apparatus provides pressure point fingers on the mats and even on the connector. This provides connected and contiguous expandability design configured with mechanical tactile stimulation (MTS).

In another advantageous feature of the present subject matter, the therapeutic apparatus acts as an anti-stress healing applicator with the help of more than a thousand "needles" or multiple pointed pyramidal or conical spikes. The therapeutic apparatus triggers natural pain relief without painkillers. The therapeutic apparatus increases blood flow to the pain area and dilates the blood vessels—the same as caffeine can do for your headache, but without any side effects.

In another advantageous feature of the present subject matter, the therapeutic apparatus remediates and even reverses stress, pain, impeded motion and inflammation regardless of the size of the area of involvement (AOI), the size of the individual and the convexity or concavity of curved body areas such as the shoulder, axilla (arm pit) front/back of the knee, curve of neck, etc.

In another advantageous feature of the present subject matter, the therapeutic apparatus provides a mat which is of a size suitable to be expanded by joining with additional mats. The connector allows to join multiple mats.

In another advantageous feature of the present subject matter, the therapeutic apparatus can be used by human beings or animals. The therapeutic apparatus is easy to use and can be deployed at home, in the office or during travels to get relaxation, pain relief, quality sleep, overcome insomnia and balanced energy levels.

In yet another advantageous feature of the present subject matter, the therapeutic apparatus helps to relax and stimulate endorphins. Further, the therapeutic apparatus helps to relax the muscles and provides relief to back stiffness and muscle tension.

In yet another advantageous feature of the present subject matter, the therapeutic apparatus can be used to place thumbs for tendonitis and for headaches including sinus pain.

In yet another advantageous feature of the present subject matter, the therapeutic apparatus provides a simple, quick and convenient way of warming up and cooling down muscles, increasing circulation and lymphatic flow and overall enhancing the consistency of recovery. The therapeutic apparatus is able to ease spastic muscle backaches, and for managing spinal disk problems. Thus, the therapeutic apparatus works as an excellent addition to chiropractic and other physiotherapy rehabilitation treatment.

Features and advantages of the subject matter hereof will become more apparent in light of the following detailed description of selected embodiments, as illustrated in the accompanying FIGS. As will be realised, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

Further features and advantages of the present subject matter will become apparent from the following detailed description, taken in combination with the appended drawings, in which.

It will be noted that throughout the appended drawings, like features are identified by like reference numerals.

DETAILED DESCRIPTION OF THE EMBODIMENTS

Before the present features and working principle of a therapeutic apparatus is described, it is to be understood that this subject matter is not limited to the particular device as described, since it may vary within the specification indicated. Various features of the therapeutic apparatus might be provided by introducing variations within the components/subcomponents disclosed herein. It is also to be understood that the terminology used in the description is for the purpose of describing the particular versions or embodiments only, and is not intended to limit the scope of the present subject matter, which will be limited only by the appended claims. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It should be understood that the present subject matter describes a therapeutic apparatus. The therapeutic apparatus includes mats. Each mat includes first pressure point fingers. Each first pressure point finger extends seamlessly from the surface of the mat. The therapeutic apparatus includes a connector connecting the mats. The connector comprises second pressure point fingers. The second pressure point fingers have a similar construction to the first pressure point finger. The mats position side-by-side with the help of the connector exposing the first pressure point fingers of each adjacent mat and the second pressure point fingers of the connector providing a continuous array of pressure point fingers. A user rests over the first pressure point fingers and the second pressure point fingers for applying pressure to targeted areas of human tissue to relieve pain and get therapeutic treatment.

Various features and embodiments of a therapeutic apparatus are explained in conjunction with the description of FIGS. 1-32.

Figure 1:
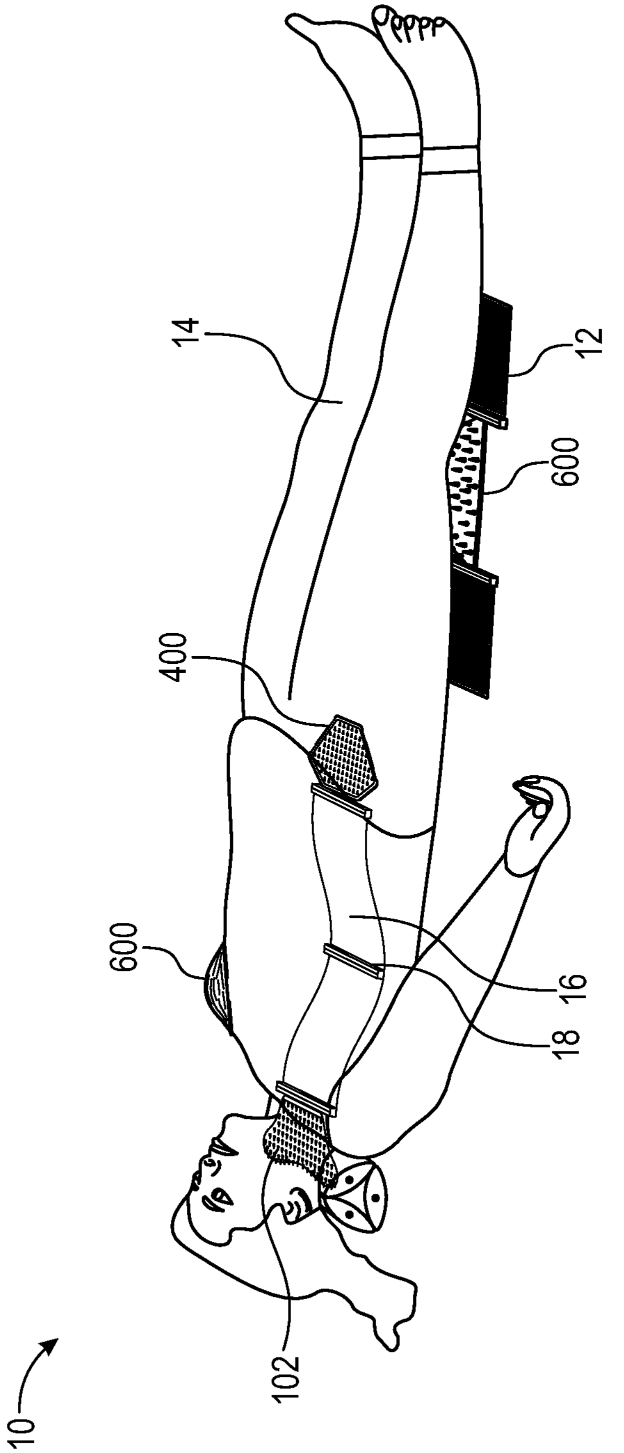
FIG. 1 illustrates shows an environment in which a therapeutic apparatus implements, in accordance with one embodiment of the present invention.
Figure 2:
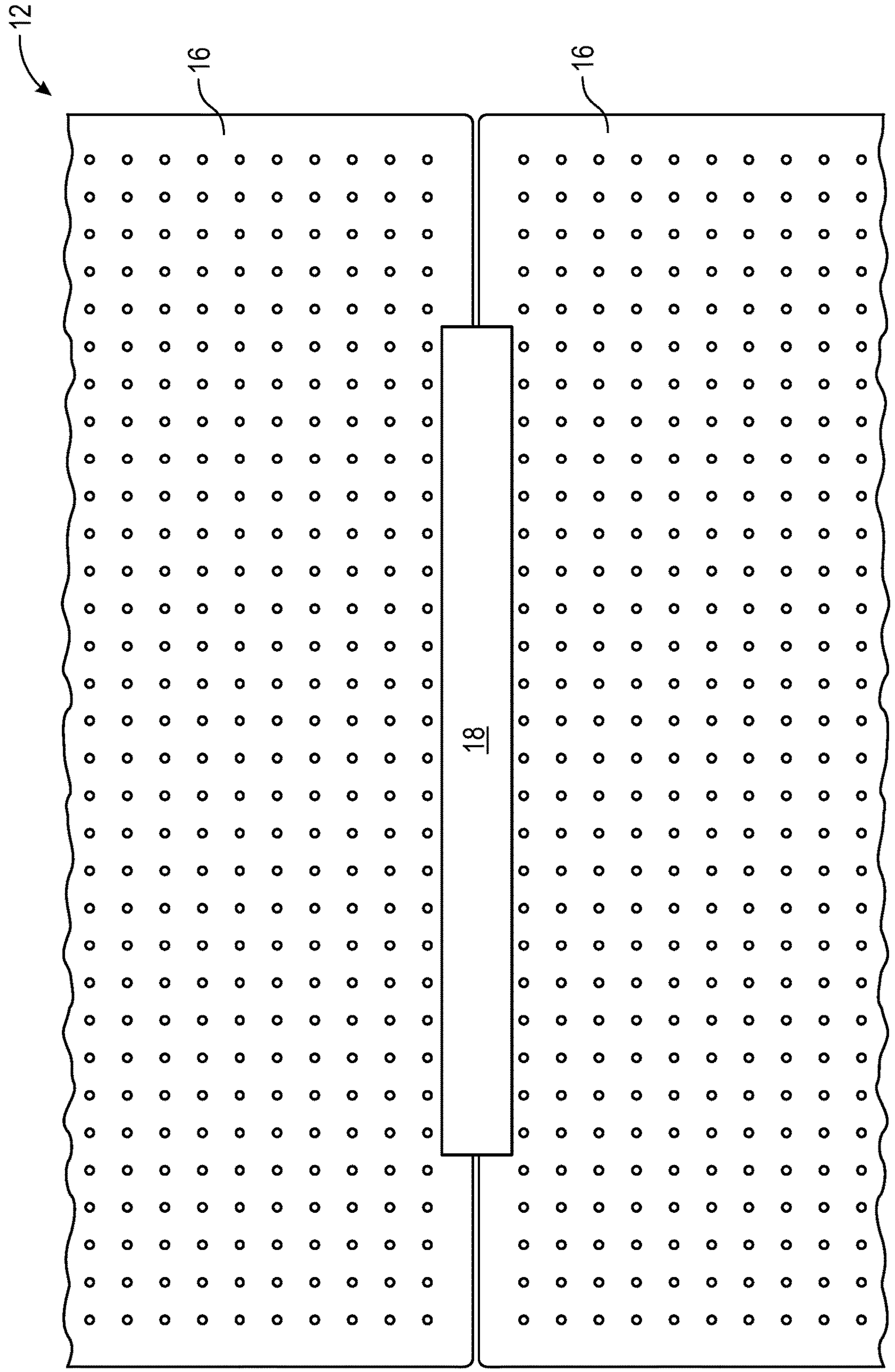
FIG. 2 illustrates a top view of the therapeutic apparatus, in accordance with one embodiment of the present invention.

The present subject matter discloses a therapeutic apparatus for applying pressure to targeted areas of human tissue to relieve pain and provide therapeutic treatment. FIG. 1 shows a representative environment 10 in which a therapeutic apparatus 12 implements, in accordance with one embodiment of the present invention. Therapeutic apparatus 12 helps a user 14 to apply pressure to targeted areas of human tissue to relieve pain and provide therapeutic treatment. Specifically, user 14 rests on therapeutic apparatus 12 such that therapeutic apparatus 12 can be used to apply pressure to the targeted areas. FIG. 2 shows a top view of therapeutic apparatus 12, in accordance with one embodiment of the present invention. Therapeutic apparatus 12 includes at least two mats 16 connected by a connector 18. In other words, connector 18 positions between two adjacent mats 16 and connect them. In one example, two mats 16 cover most of the spine area and are wider than an adult's torso width.

Figure 3B:
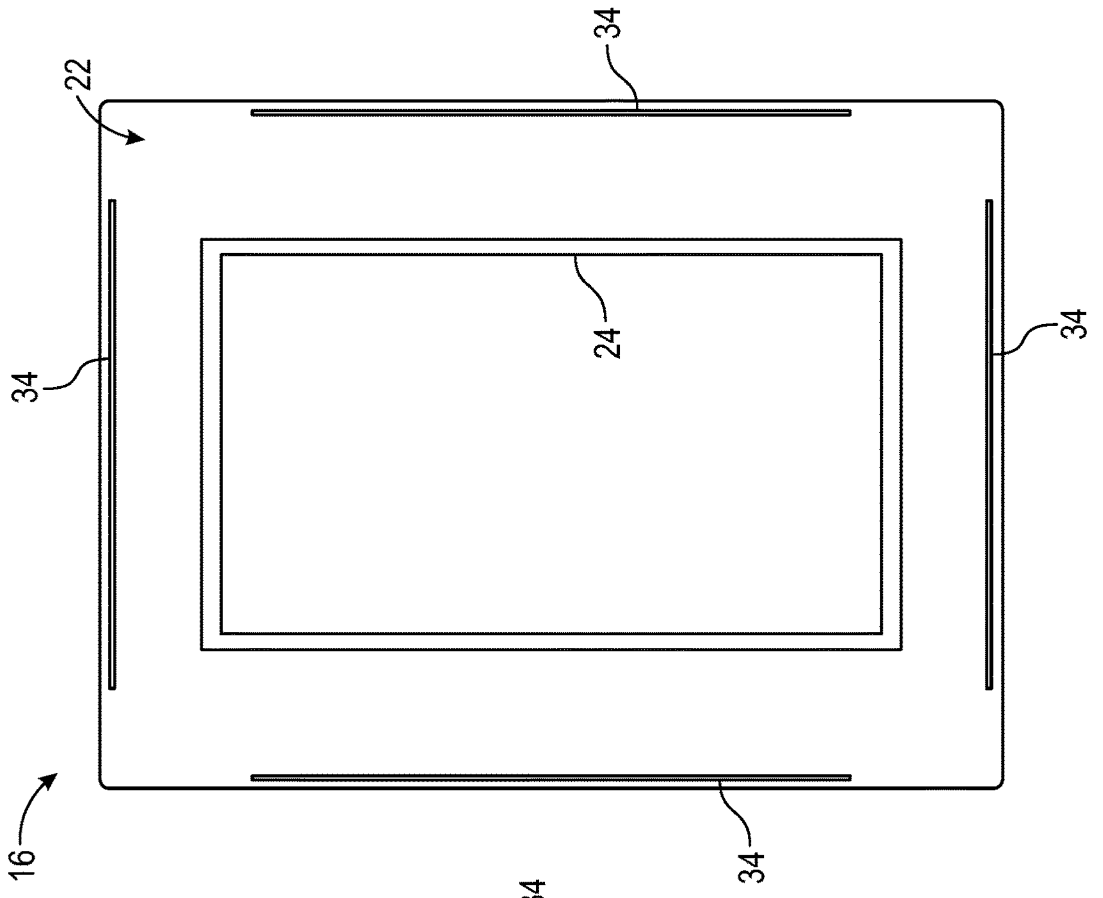
FIGS. 3A and 3B illustrate a top view and a bottom view, respectively of a mat, in accordance with one embodiment of the present invention.
Figure 3A:
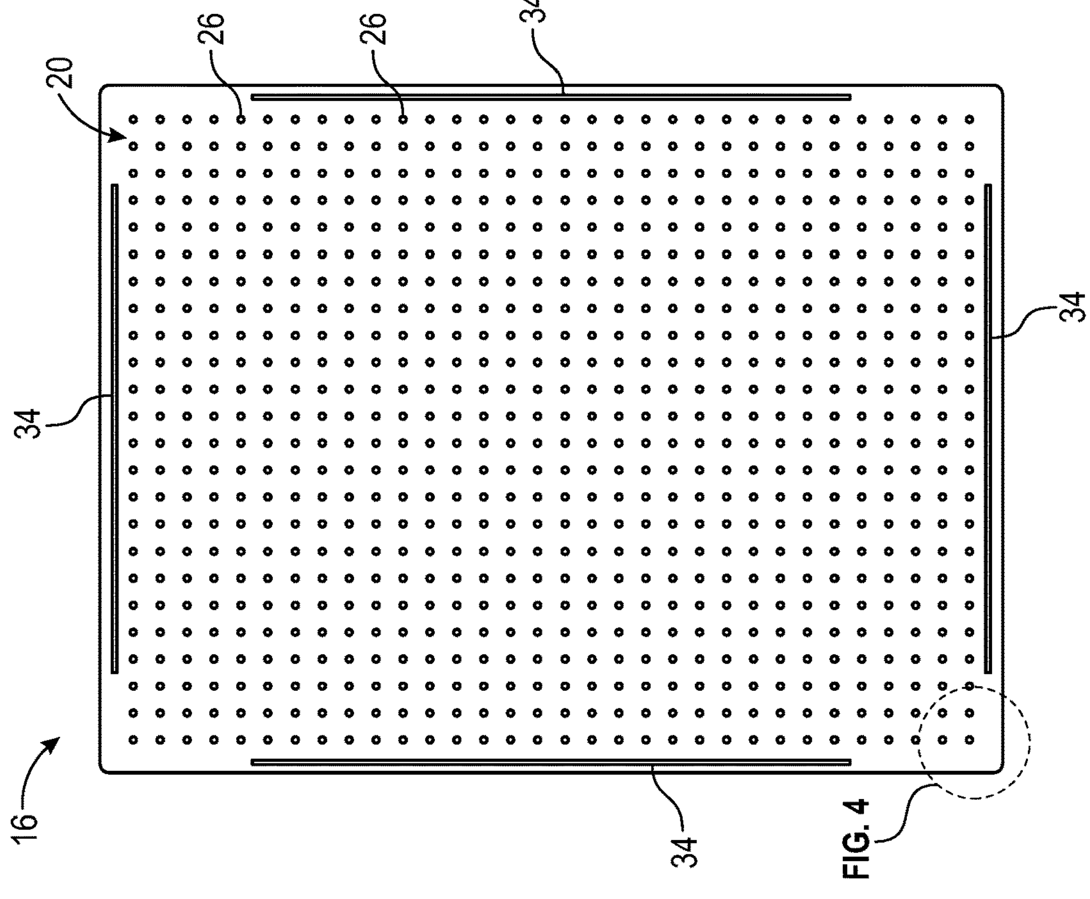

FIGS. 3A and 3B show a top view and a bottom view, respectively of mat 16, in accordance with one embodiment of the present invention. Mat 16 comes in a triangular, square, rectangular, pentagonal, hexagonal or any other configuration. Mat 16 provides a material such as synthetic (flexible) or any other suitable material. Mat 16 is made of a single and seamless synthetic or non-porous material. Mat 16 has a suitable thickness and strength to withstand the weight of user 14. In one example, mat 16 is made of a rigid material to resist flexing or distortion. Mat 16 includes a first surface 20 and a second surface 22. First surface 20 indicates a top surface that faces top and allows user 14 to lie down or rest over it. Second surface 22 indicates a bottom surface of mat 16 that faces the ground or any surface such as a table, for example. In one example, second surface 22 encompasses a small ridge 24 in a square or rectangular configuration at the centre or edges of mat 16. Ridge 24 provides friction such that mat 16 sits firmly over the ground when in use. Further, ridge 24 provides structural support for equal pressure to be applied throughout the surface area.

Figure 4:
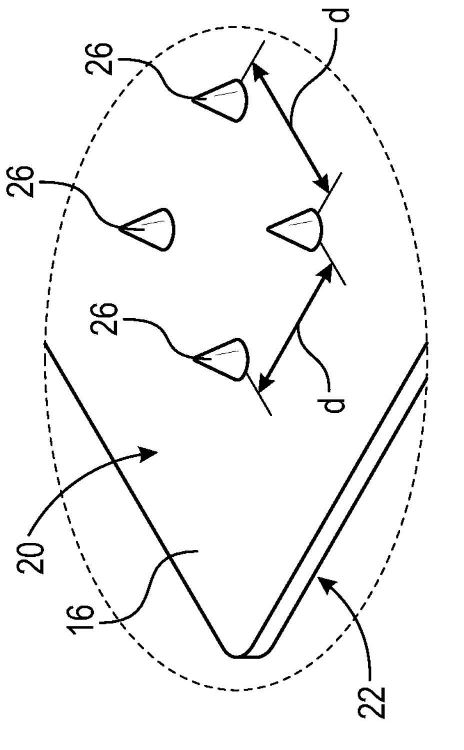
FIG. 4 illustrates a perspective view of the mat having pressure point fingers, in accordance with one embodiment of the present invention.

Mat 16 includes a plurality of pressure point fingers or pressure point fingers or first pressure point fingers 26 or simply a pressure point finger 26 when referred to a single pressure point finger 26. Pressure point fingers 26 are made of a single and seamless synthetic (flexible) or any other non-porous suitable material. In one example, pressure point fingers 26 are made of rigid material to resist flexing or distortion. Pressure point fingers 26 extend from first surface 20 facing the roof when mat 16 is placed on the ground (i.e., when second surface 22 faces and comes in contact with the ground). FIG. 4 shows a perspective view of mat 16 encompassing pressure point fingers 26. As can be seen, pressure point fingers 26 position at a predefined distance d from one another. A person skilled in the art understands that pressure point fingers 26 are substantially equally spaced apart linearly and laterally as indicated by similar distance d. It is preferable to provide minimum distance d between pressure point fingers 26 such that hair or any particles do not get accumulated at pressure point fingers 26. In one example, pressure point fingers 26 are positioned in a series of rows over the entire area of first surface 20. In another example, pressure point fingers 26 are positioned in a predefined pattern based on the need.

Figure 5:
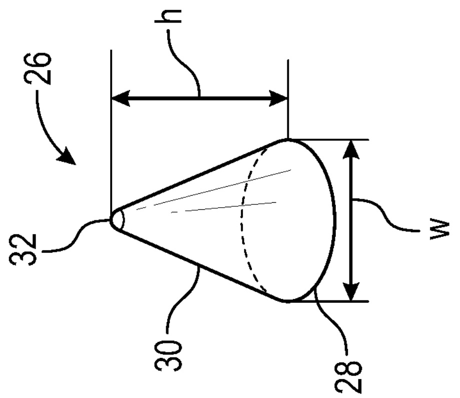
FIGS. 5, 6 and 7 illustrate geometric shapes of the pressure point fingers, i.e. having an oval, a triangular and a rectangular base, respectively, in accordance with one embodiment of the present invention.

Each pressure point finger 26 includes a base 28, a shaft 30 and a tip 32, as shown in FIG. 5, for example. FIG. 5 shows pressure point finger 26 in a triangular configuration in which base 28 is in a circular configuration and has a width w. In one example, tip 32 is substantially tapered or rounded to prevent poking or causing injury to user 14 when user 14 lies down or places hands or any other part of the body over pressure point fingers 26. As can be seen, shaft 30 tapers outwardly from tip 32 to base 28. As such, base 28 has more width than tip 32. Shaft 30 has a suitable height h. The height of shaft 30 is selected in such a way that height h is greater than width w of shaft 30. In one example, both shaft 30 and width w have equal length, say 0.125 inches or less.

Figure 6:
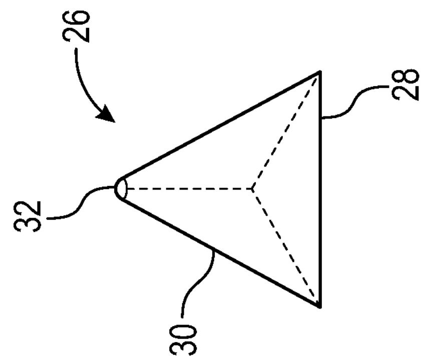
Figure 7:
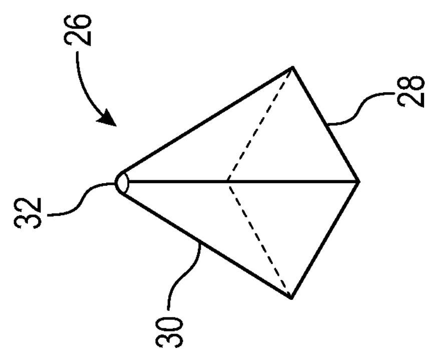
Figure 8:
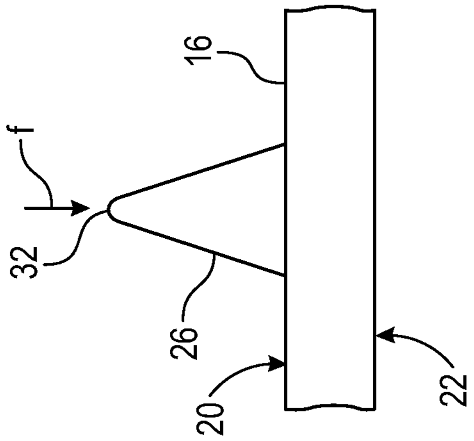
FIG. 8 illustrates a force applied to a tip of the substantially rigid pressure point finger, in accordance with one embodiment of the present invention.

A person skilled in the art understands that base 28 can come in various configurations. For example, base 28 may come in a triangular configuration. Here, shaft 30 is formed at an angle, as shown at FIG. 6. In another example, base 28 may come in a square or rectangular configuration, as shown in FIG. 7. Here, shaft 30 extends from the edges of the square or rectangular configuration until tip 32. Base 28, shaft 30 and tip 32 are designed in such a way that when force f is applied at tip 32 by way of user 14 sitting or placing his/her hands or any other body part, tip 32 stimulates therapeutic treatment while resisting skin penetration. FIG. 8 shows the application of force f at tip 32, in accordance with one exemplary embodiment of the present invention. As each pressure point finger 26 is made of a rigid material, pressure point fingers 26 have resistance to pressure or force f acting thereon.

In one implementation, mat 16 encompasses elongated grooves 34 at the sides, as shown in FIGS. 3A and 3B. Elongated grooves 34 are formed by chipping or cutting away a portion of mat 16 parallel to the edges of mat 16.

Figure 9:
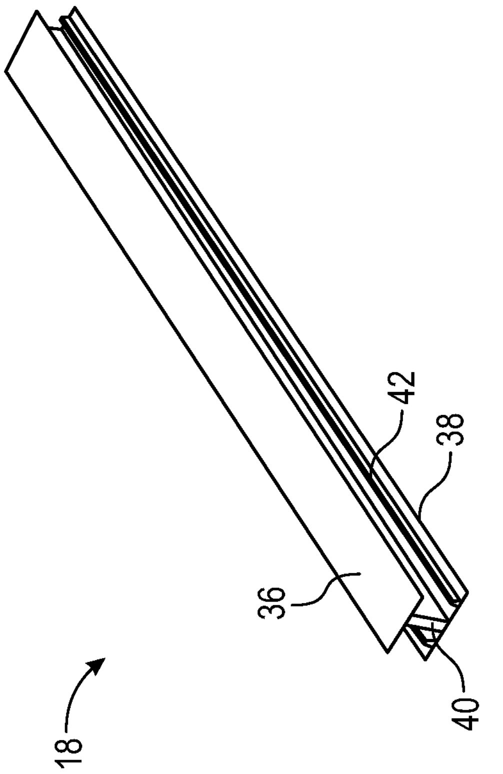
FIGS. 9 and 10 illustrate a perspective view and a cross-sectional view, respectively of a connector, in accordance with one embodiment of the present invention.
Figure 10:
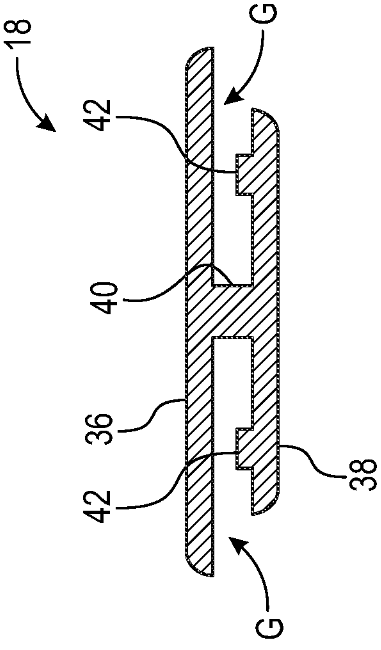

Now referring to FIGS. 9 and 10, a perspective view and a cross-sectional view, respectively of connector 18 are shown, in accordance with one embodiment of the present invention. Connector 18 helps to connect adjacent mats 16, as shown in FIG. 2, for example. Connector 18 comes in an elongated configuration. Connector 18 is made of a material such as synthetic, non-fabric, non-porous fabric or any other suitable material. Connector 18 has a length substantially the same as elongated grooves 34 or the entire length/width of mat 16 depending on the need. Connector 18 is extruded and includes a first flange 36 and a second flange 38 connected by a web 40. Here, first flange 36 indicates a top flange and second flange 38 indicates a bottom flange. First flange 36 has a greater width than the width of second flange 38, or vice versa. Web 40 acts as a connecting member that connects first flange 36 and second flange 38 at the centre, as shown in FIG. 9, for example. As can be seen from FIG. 10, first flange 36 and second flange 38 form a pair of gaps G on opposite sides of web 40. Gaps G help to receive mats 16 from each side of connector 18.

Figure 11:
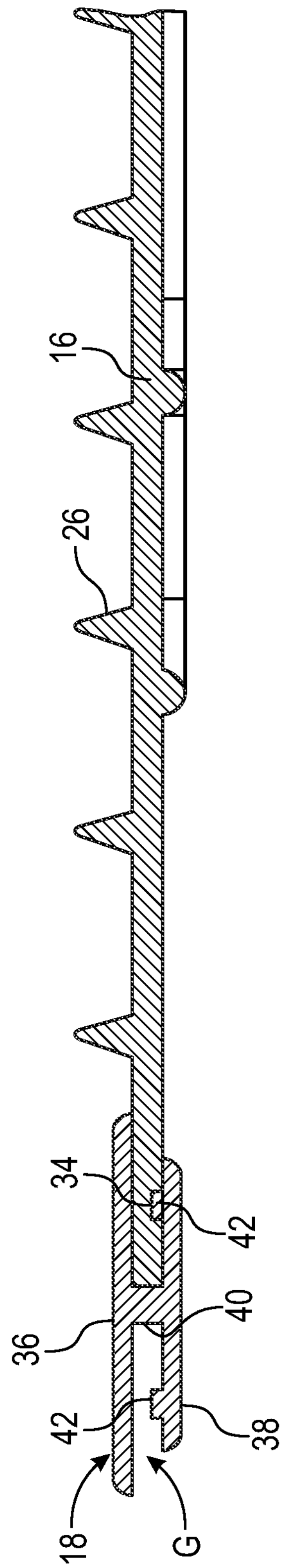
FIG. 11 illustrates a cross-sectional view of the connector connecting the mat, in accordance with one embodiment of the present invention.

In one embodiment, second flange 38 encompasses a pair of ribs 42. In one example, ribs 42 extend along the entire length of second flange 38. Each rib 42 extends from second flange 38 at either side of web 40 facing first flange 36. When connector 18 receives mat 16 through gap G, rib 42 inserts through groove 34 of mat 16 and keeps mat 16 in position between first flange 36 and second flange 38. In one example, user 14 applies manual pressure to either or both flanges 36, 38 to seat rib 42 into groove 34 in an interference fit for easy attachment and detachment. FIG. 11 shows a cross-sectional view of connector 18 connecting mat 16, in accordance with one exemplary embodiment of the present invention. Optionally, ribs 42 are replaced by a row of protrusions (not shown). However, a continuous elongated rib 28 is preferred as shown in FIG. 9.

Figure 12:
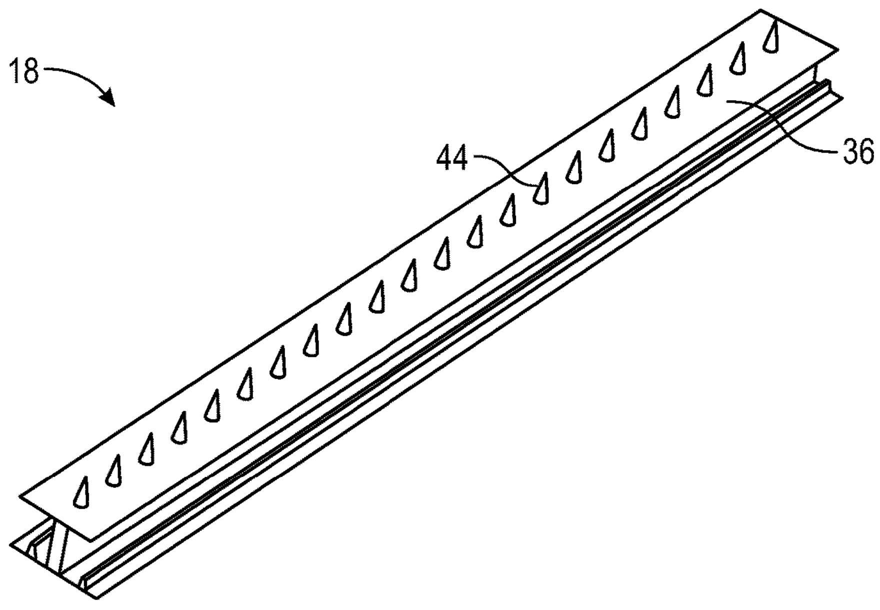
FIG. 12 illustrates a perspective view the connector having pressure point fingers, in accordance with one embodiment of the present invention.

In the above embodiment, first flange 36 is relatively flat (FIG. 2) while adjacent mats 16 connecting connector 18 have pressure point fingers 26. This results in a gap at first flange 36 and may lead to improper therapeutic treatment. In order to overcome the improper therapeutic treatment, first flange 36 may be provided with a plurality of second pressure point fingers 44. FIG. 12 shows an exemplary connector 18 having plurality of second pressure point fingers 44 over the entire length of first flange 36. By providing plurality of second pressure point fingers 44 over first flange 36, pressure point fingers 26 on mat 16 and second pressure point fingers 44 on first flange 36 provide a continuous placement of pressure point fingers 26, 44. As a result, the therapeutic treatment can be provided to user 14 as desired.

A person skilled in the art understands a single mat 16 can be utilised as a standalone device for providing therapeutic treatment to a specific area of a user's body, such as a back and shoulder region of an upper torso. When single mat 16 is insufficient to treat the desired area, a plurality of identical mats 16 can be combined and positioned, side-by-side with the help of connector 18, as shown in FIG. 2 (and FIG. 12), for example.

Figure 13:
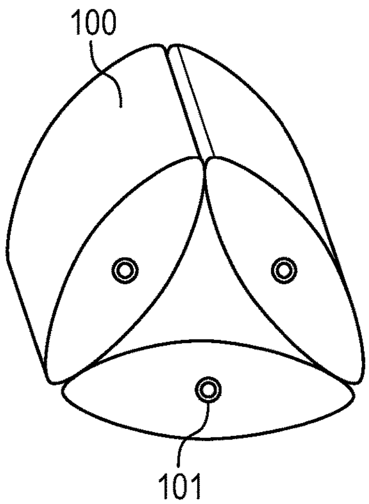
FIGS. 13 and 14 illustrate use of the therapeutic device with a sectional and jointed inflatable air cushion in a rolled configuration, in accordance with one exemplary embodiment of the present invention.
Figure 14:
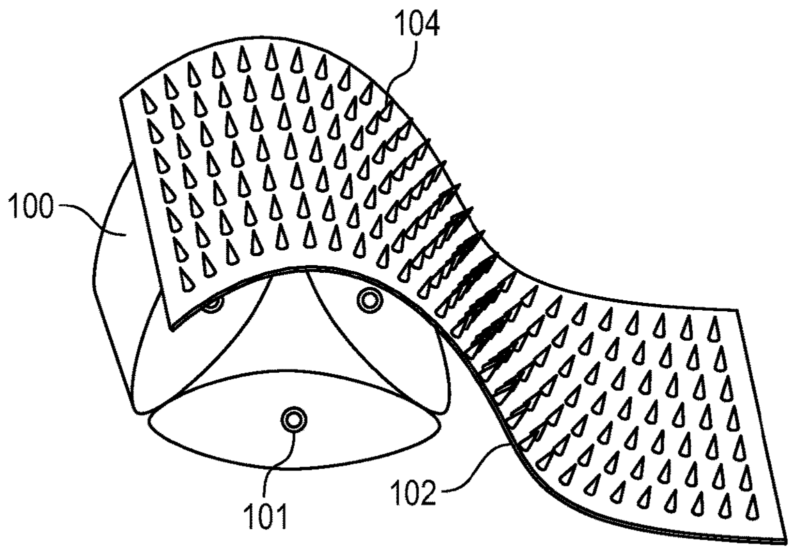

FIG. 13 shows a sectional/chamber and jointed inflatable contour pillow 100 having an intake hole 101 for inflating inflatable contour pillow 100. FIG. 14 shows a therapeutic apparatus i.e., mat 102 (similar to mat 16) having pressure point fingers 104. Here, therapeutic apparatus 102 is placed over inflatable contour pillow 100 to provide therapeutic treatment to the neck, torso, lower back, behind the knee, axilla, hands, feet, calves, etc. The user lies on his/back over therapeutic apparatus 102 and places his/her head over contour pillow 100. In addition, therapeutic apparatus 102 contours and helps to enhance focal pressure.

Figure 15:
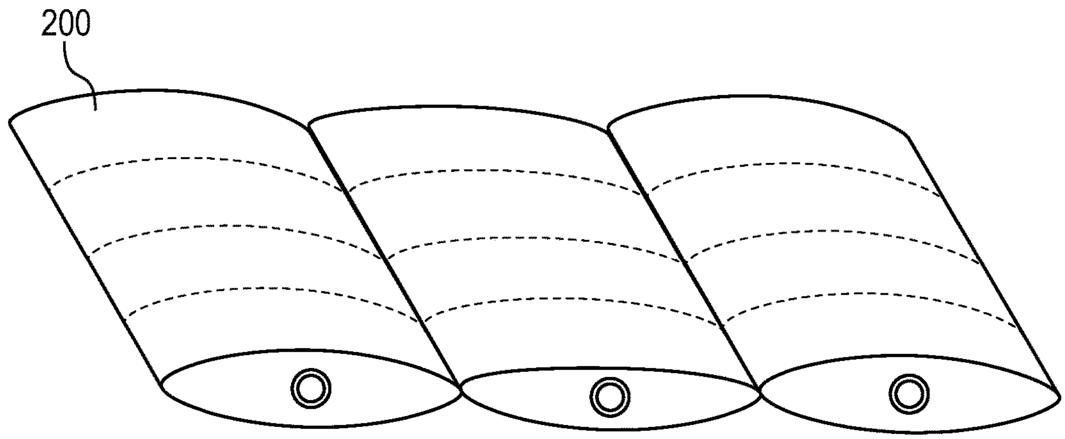
FIGS. 15 and 16 illustrate use of the therapeutic device with a sectional and jointed inflatable air cushion in a flat configuration, in accordance with one exemplary embodiment of the present invention.
Figure 16:
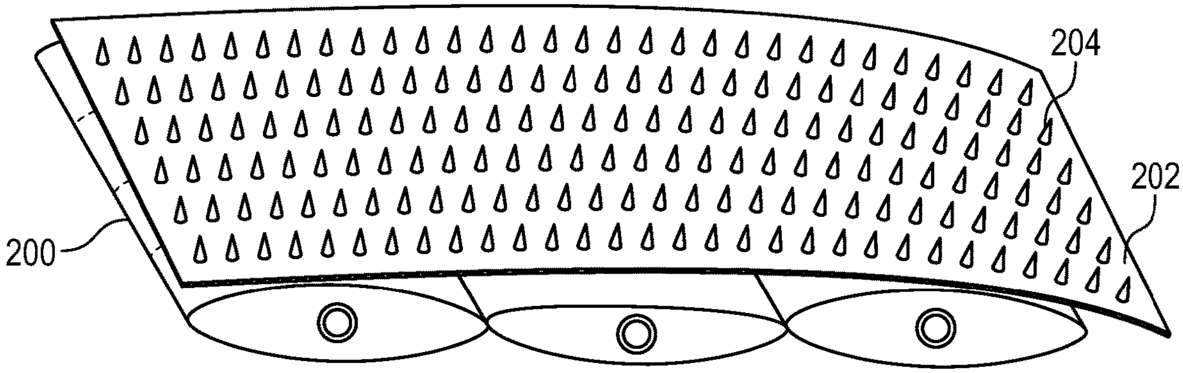

Alternatively, the pillow is spread over the ground and the mat is placed over the pillow to perform therapeutic treatment. FIG. 15 shows a pillow 200 spread over the ground. FIG. 16 shows a therapeutic apparatus i.e., mat 202 having pressure point fingers 204 placed over pillow 200. Here, user

14 lies down on therapeutic apparatus 202 to get therapeutic treatment for a larger area on his/her body. In one example, the middle section of pillow 200 is slightly deflated (or not inflated). This helps to increase pressure at desired areas. Further, mat 202 having pressure point fingers 204 provide focal pressure enhancement that correlates with the optimal spinal curvatures by the inflatable providing a fulcrum traction into the spine while simultaneously decreasing muscle tension thereby enhancing ligamentous stretch known a CREEP effect. This is the spinal reshaping that chiropractors use to normalize spinal curves.

The above embodiments show the therapeutic apparatus or mat in a square or a rectangular configuration. However, a person skilled in the art understands that the therapeutic apparatus can come in a variety of shapes or configurations with or without a provision for the connector to connect with adjacent mats without departing from the scope of the present invention. In one example, the therapeutic apparatus can come in a trapezoidal, pentagon, hexagon, convex or concave configuration depending on the need.

Figure 17:
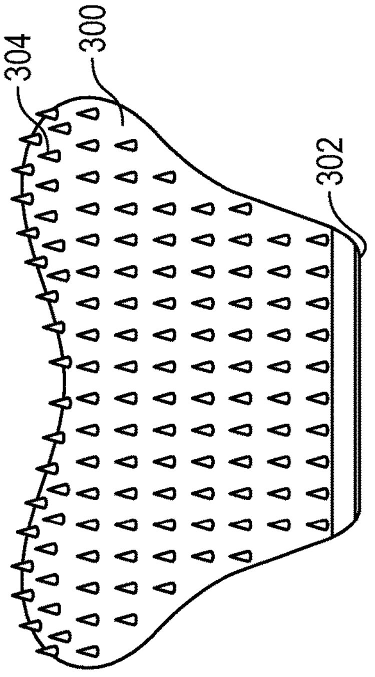
FIGS. 17 through 21 illustrate the therapeutic device in various configuration for use on shoulders, elbows, axillary fossa, knees, skull, popliteal fossa and heels in accordance with one exemplary embodiment of the present invention.

FIG. 17 shows a therapeutic apparatus 300 in a trapezoidal configuration, in accordance with one exemplary embodiment of the present invention. Therapeutic apparatus 300 is used for providing occipital relief to the neck/head. Therapeutic apparatus 300 encompasses a connector site 302 at the bottom. Further, therapeutic apparatus 300 includes pressure point fingers 304. Pressure point fingers 304 to provide the occipital relief to the user. Therapeutic apparatus 300 connects to rectangular therapeutic apparatus (not shown, similar to mat 16 in FIG. 3A, for example) via connector site 302. Here, therapeutic apparatus 300 and the rectangular therapeutic apparatus connect contiguously to relief to the neck area (therapeutic apparatus 300) and back area/spine (rectangular therapeutic apparatus) of the user.

Figure 18:
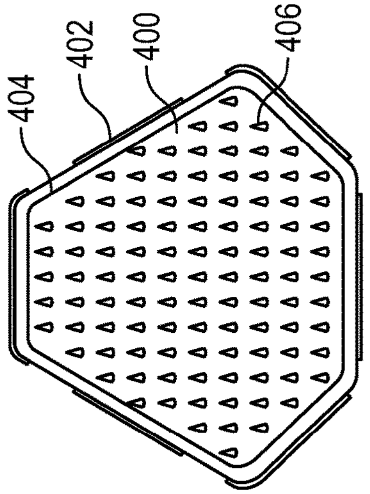

FIG. 18 shows a therapeutic apparatus 400 in a pentagonal configuration, in accordance with one exemplary embodiment of the present invention. Therapeutic apparatus 400 is used for providing therapeutic treatment for sacrum (i.e., the bone near the base of spine). Therapeutic apparatus 400 encompasses connector means or connector sites 402 at the sides/edges for connecting connectors. Connector sites 402 indicate areas at therapeutic apparatus 400 that are used to connect rectangular therapeutic apparatus (not shown, similar to mat 16 in FIG. 3A, for example) connectors (not shown, similar to connector 18). Further, therapeutic apparatus 400 encompasses connector locking channels or grooves 404 (similar to groove 34) for locking the connector to therapeutic apparatus 400. Furthermore, therapeutic apparatus 400 includes pressure point fingers 406 to provide therapeutic treatment to the sacrum. In the present embodiment, therapeutic apparatus 400 and the rectangular therapeutic apparatus connect contiguously to relief to sacrum/pelvis area (therapeutic apparatus 340) and back area/spine (rectangular therapeutic apparatus) of the user.

Figure 19:
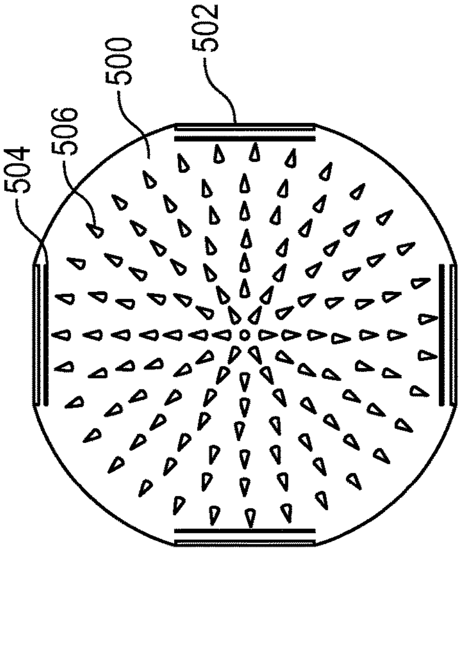

FIG. 19 shows a therapeutic apparatus 500 in a hexagonal configuration, in accordance with one exemplary embodiment of the present invention. Therapeutic apparatus 500 is used for providing therapeutic treatment for curved body parts such as shoulders, elbows, axillary fossa, knees, popliteal fossa & heels, etc. Therapeutic apparatus 500 encompasses connector means or connector sites 502 at the edges for connecting connectors. Connector sites 502 indicate areas at therapeutic apparatus 500 that are used to connect the connectors. Further, therapeutic apparatus 500 encompasses connector locking channel or grooves 504 for locking the connector to therapeutic apparatus 500. Furthermore, therapeutic apparatus 500 includes pressure point fingers

506 to provide therapeutic treatment to the shoulders, elbows, axillary fossa, knees, popliteal fossa & heels, etc.

Figure 20:
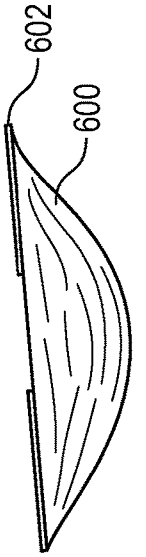
Figure 21:
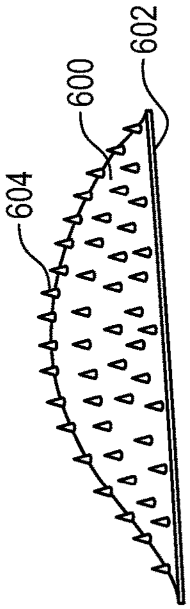

FIGS. 20 and 21 show a therapeutic apparatus 600 that can be worn upside down i.e., convex (FIG. 20), and concave (FIG. 21), in accordance with one exemplary embodiment of the present invention. A person skilled in the art understands that therapeutic apparatus 600 is the same as therapeutic apparatus 500 and therapeutic apparatus 600 is shown to illustrate the convex (FIG. 20), and concave (FIG. 21) configuration of therapeutic apparatus 500. Therapeutic apparatus 600 encompasses connector means or connector sites 602 at the edges for connecting connectors. Connector sites 602 indicate areas at therapeutic apparatus 600 that are used to connect the connectors. Further, therapeutic apparatus 600 includes pressure point fingers 604. Here, therapeutic apparatus 600 is positioned in convex configuration to conceal pressure point fingers 604, as shown in FIG. 20. Further, therapeutic apparatus 600 is positioned in concave configuration to expose pressure point fingers 604, as shown in FIG. 21. In one example, therapeutic apparatus 600 in the convex configuration is used for shoulders or heels. In one example, therapeutic apparatus 600 in the concave configuration is used for the back of the knee. In order to change the configuration, the user pushes therapeutic apparatus 600 from one side to another.

Figure 22:
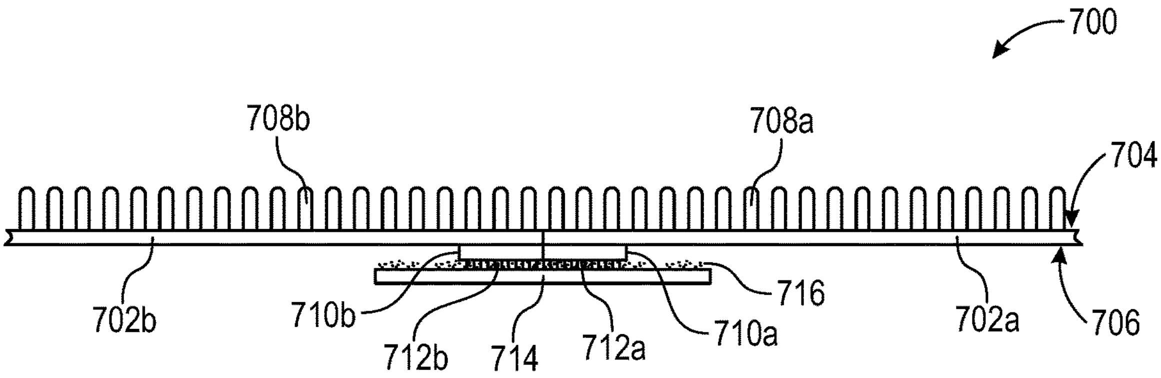
FIG. 22 illustrates a side view of the therapeutic apparatus, in accordance with another embodiment of the present invention.
Figure 24:
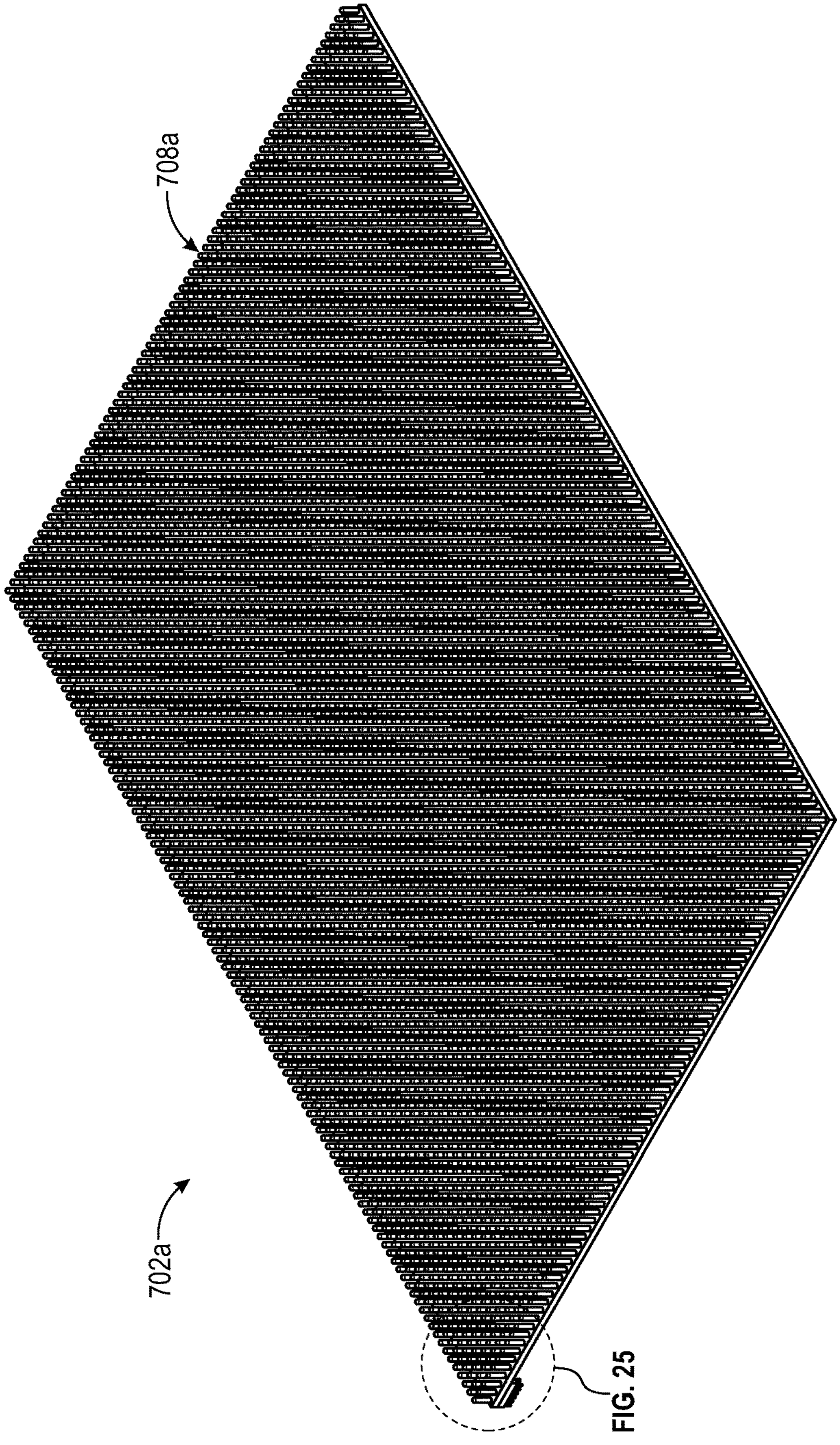

FIG. 22 shows a side view of a therapeutic apparatus 700, in accordance with another embodiment of the present invention. Therapeutic apparatus 700 includes a first mat 702*a* and a second mat 702*b*. Each of first mat 702*a* and second mat 702*b* includes all the features and operates similarly to mat 16, as explained above. Each of first mat 702*a* and second mat 702*b* has a first surface 704 and a second surface 706. First surface 704 indicates a top surface and second surface 706 indicates bottom surface. First mat 702*a* includes first pressure point fingers 708*a* at first surface 704. FIG. 24 shows a top perspective view of first mat 702*a*. Similarly, second mat 702*b* includes second pressure point fingers 708*b* at first surface 704. Each of first pressure point fingers 708*a* and second pressure point fingers 708*b* include all features and operate similar to pressure point fingers 26, as explained above. Although first pressure point fingers 708*a* and second pressure point fingers 708*b* are presented in curved configuration, a person skilled in the understands first pressure point fingers 708*a* and second pressure point fingers 708*b* can come in conical configuration as presented above (e.g., FIGS. 4 and 7) without departing from the scope of the present invention.

Figure 23:
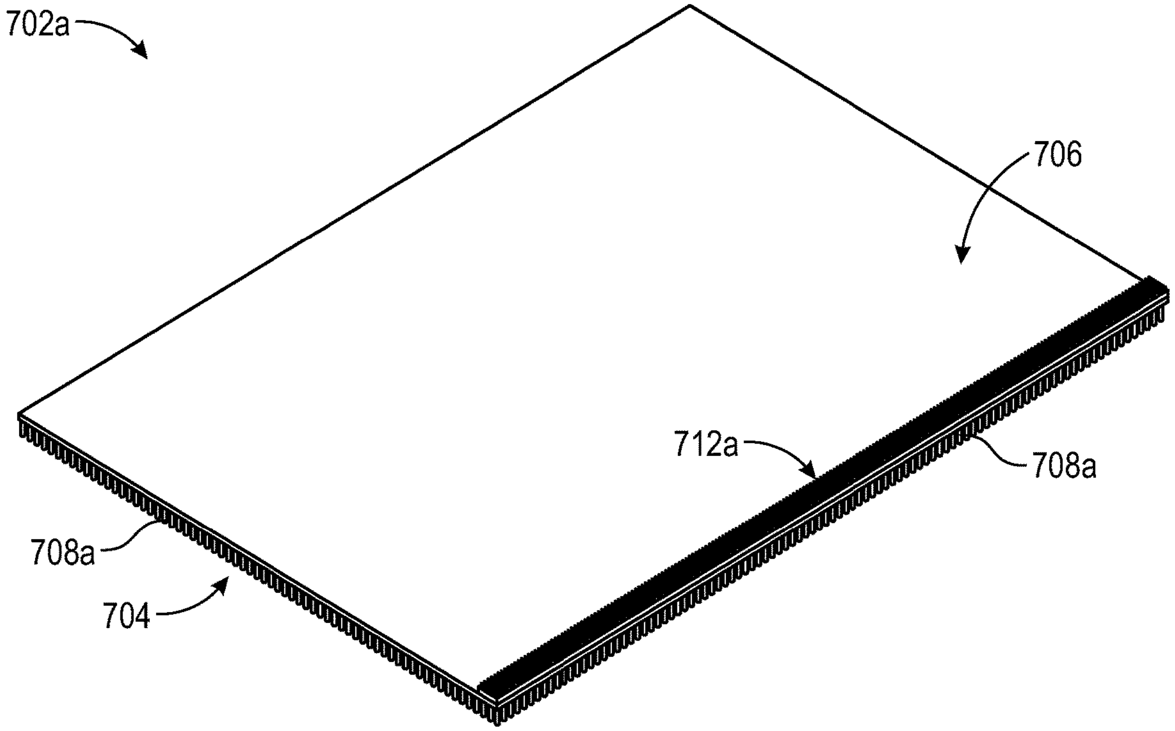
FIGS. 23 and 24 illustrate a bottom perspective view and a top perspective view of the therapeutic apparatus, in accordance with one embodiment of the present invention.
Figure 25:
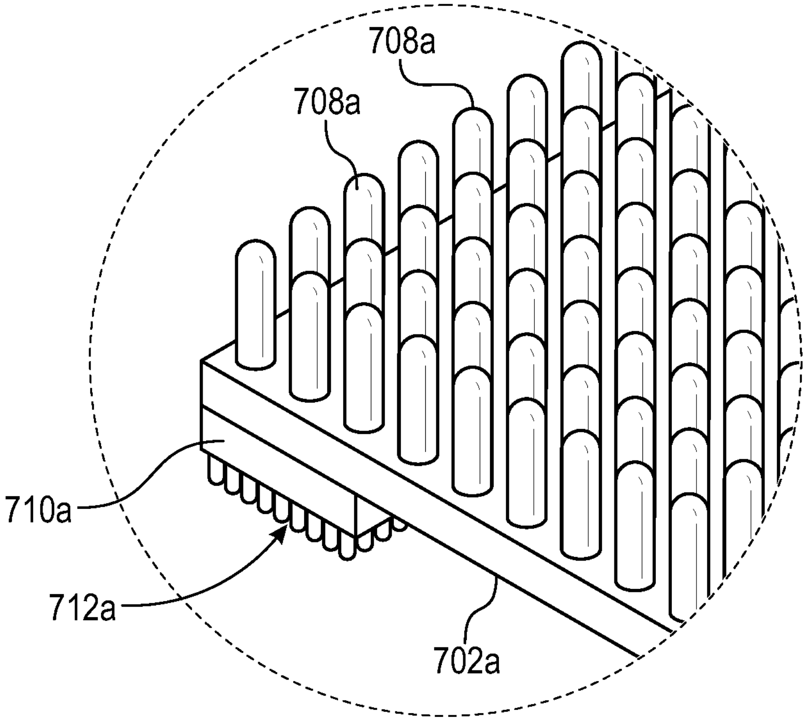
FIG. 25 illustrates a perspective view of a mat having pressure point fingers, in accordance with one embodiment of the present invention.

At second surface 706, first mat 702*a* includes a first connecting member 710*a*. FIG. 23 shows a bottom perspective view of first mat 702*a* having first connecting member 710*a*. Further, FIG. 25 shows a detailed top perspective view of first mat 702*a* having first connecting member 710*a*. As can be seen, first connecting member 710*a* mounts at one edge/side of first mat 702*a*. First connecting member 710*a* indicates a rigid material mounted underneath first mat 702*a*. First connecting member 710*a* encompasses first hooks 712*a*. First hooks 712*a* extend from the surface of first connecting member 710*a*.

Figure 26:
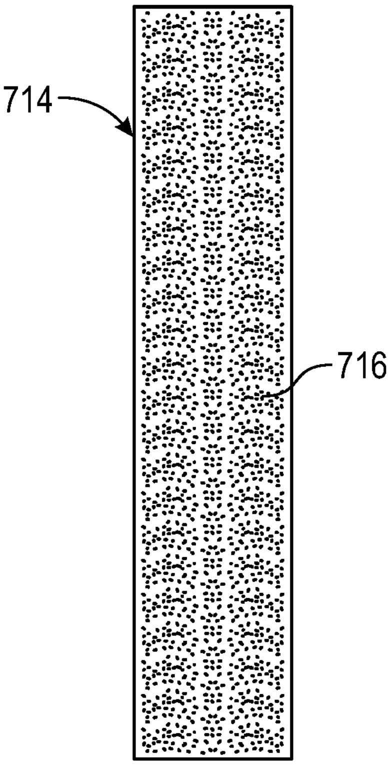
FIGS. 26 and 27 illustrate a top view and a side view, respectively of a connector, in accordance with one embodiment of the present invention.
Figure 27:
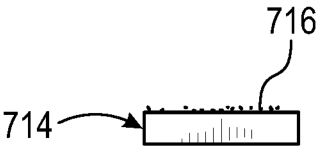

Further, therapeutic apparatus 700 includes a connector 714. FIGS. 26 and 27 show a top view and a side view, respectively of connector 714, in accordance with one embodiment of the present invention. Connector 714 provides a flexible or rigid material depending on the need. Preferably, connector 714 includes a flexible material. Connector 714 comes in a suitable length to connect first mat 702*a* and second mat 702*b* with or without gap. In one example, the length of connector 714 is selected such that the length is the same or longer than the first connecting member 710*a* and second connecting member 710*b*. Optionally, connector 714 comes in the shape of connector 18 having pressure point fingers (similar to second pressure point fingers 44, as shown in FIG. 12). Connector 714 encompasses loops 716. Loops 716 extend from connector 714 facing first connecting member 710*a* and second connecting member 710*b*, as shown in FIG. 22.

Figure 28:
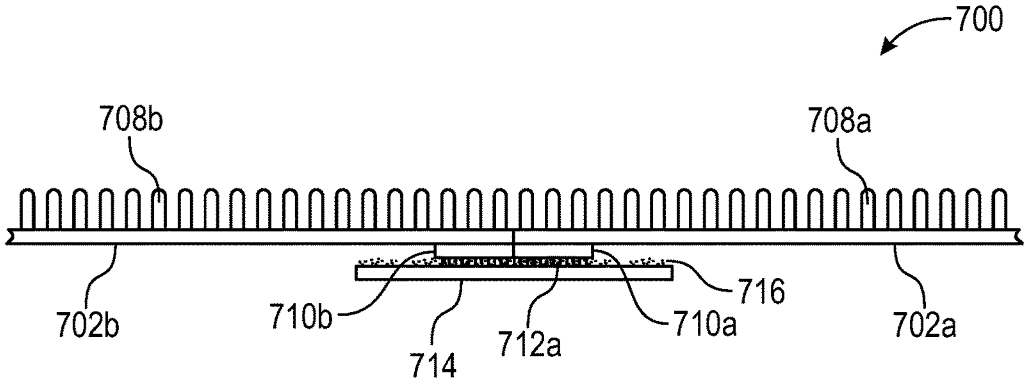
FIGS. 28 through 30 illustrate the connector interconnecting adjacent mats, in accordance with one embodiment of the present invention.
Figure 29:
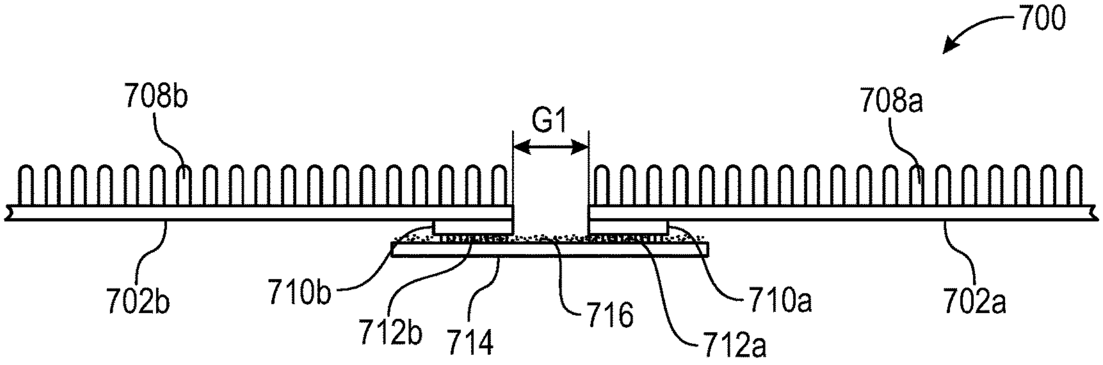
Figure 30:
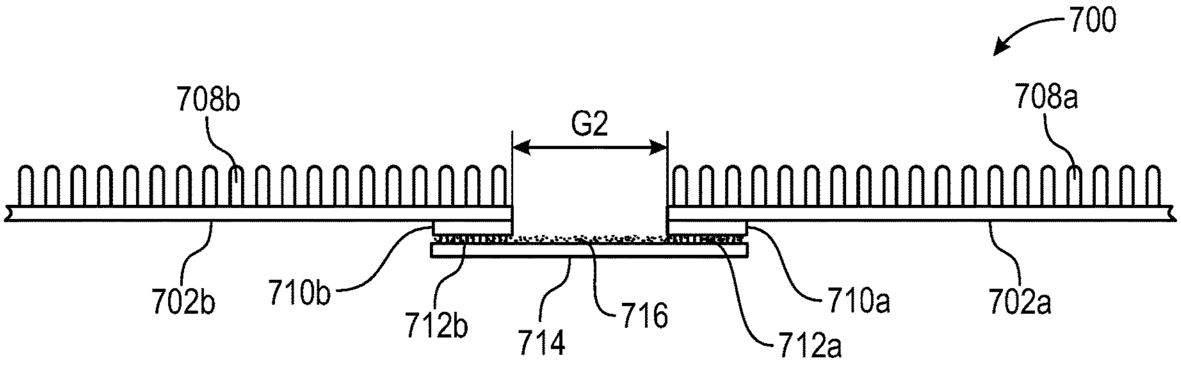

Now referring to FIGS. 28 through 30, interconnecting adjacent first mat 702*a* and second mat 702*b* with and without gap are shown, in accordance with one embodiment of present invention. FIG. 28 shows first mat 702*a* and second mat 702*b* connected with the help of connector 714. Here, first mat 702*a* and second mat 702*b* are in contact with no gap in between. FIG. 29 shows first mat 702*a* and second mat 702*b* connected with the help of connector 714 with a gap G1. FIG. 30 shows first mat 702*a* and second mat 702*b* connected with the help of connector 714 with a further gap G2. As can be seen, gap G2 is wider than gap G1.

Figure 31:
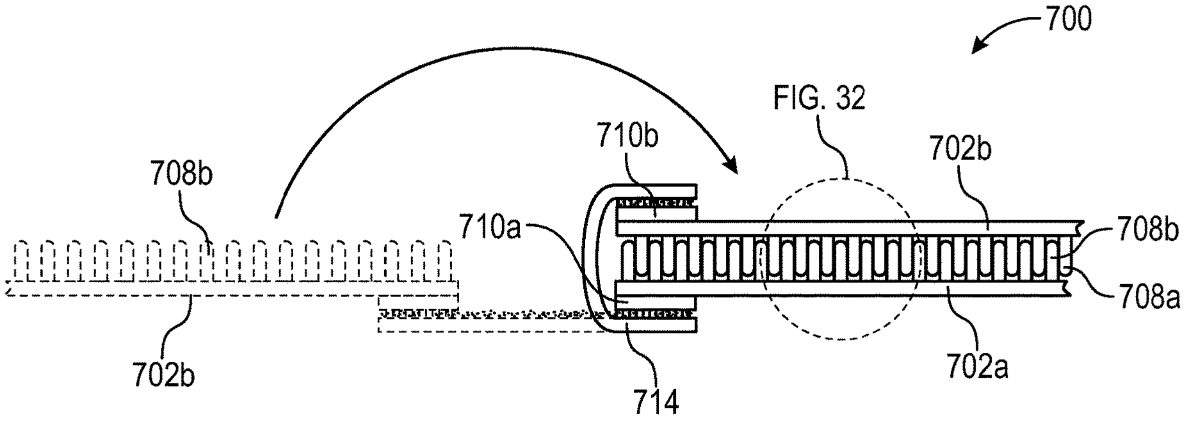
FIGS. 31 and 32 illustrate the connector clamped on side-by-side edges of adjacent mats, in accordance with one embodiment of the present invention.
Figure 32:
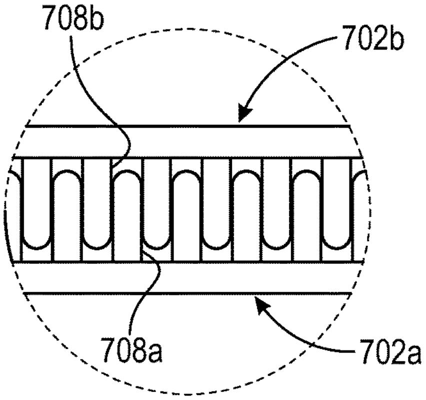

When not in use, second mat 702*b* is folded and positioned over first mat 702*a*, as shown in FIG. 31. As connector 714 is flexible, second mat 702*b* folds easily. When second mat 702*b* is positioned/stacked over first mat 702*a*, second pressure point fingers 708*b* intersect/intermesh with first pressure point fingers 708*a*, as shown in FIG. 32. Here, connector 714 acts as a hinge. Further, hooks 712*a*, 712*b* and loops 716 act similar to a hook and loop fastening mechanism and allows for easy attachment and detachment. Placing second mat 702*b* over first mat 702*a* enables folding of therapeutic apparatus 700. When not in use, therapeutic apparatus 700 can be easily stored or transported without having to separate first mat 702*a* and second mat 702*b*.

Based on the above, it is evident that the presently disclosed invention provides a mat which can be used singly or connected to one or more additional mats to provide a desired size combination of the mats. One mat is interconnected with an adjacent mat by use of a connector such that the adjacent mats can be connected together. Each mat includes an array of pressure point fingers for applying pressure to targeted areas of human tissue to relieve pain and provide therapeutic treatment. The therapeutic apparatus can be used for relief from pain, injuries, headaches, energy boosts and insomnia.

For example, the therapeutic apparatus can be used for quick back relief. In order to use, the user places the therapeutic apparatus such that the pressure point fingers face the top. The user rests his/her back over the pressure point fingers for a predetermined time period or as needed. The pressure point fingers stimulate the therapeutic treatment to provide relief to the user's back. The user can use the therapeutic apparatus at home, office or even during travel e.g., in a car, train, flight, etc.

The applicants or inventors of the present invention intend to market the therapeutic apparatus as "ASHA", "Anti-Stress Healing Applicator" "Torture pad", "Panacea", "SCADER P" or "Scatter Pain" or any other suitable names. SCADER P is a short form of sterility and safety (S), capability and compatibility (C), affordability (A), durability (D), expandability (E), reusability (R) and portability (P).

The therapeutic apparatus is made of a single plastic injected moulded device without any joints. The connectors provide an expandable feature to increase the area as desired. The therapeutic apparatus is capable of withstanding different sterilization methods such as use of soap, water, boiling water bath, alcohol, hydrogen peroxide, bleach, etc.

(sterility and safety (S)). The therapeutic apparatus is safe to use and can be made available over the counter (OTC) (capability (C)).

The therapeutic apparatus is capable of improving a person's experience in therapeutic conditions including, but not limited to, tight muscles, muscle pain, joint pain, low back pain, neck pain, headache, chronic fatigue, stress activity, sleeplessness, mental activity, etc. capability and compatibility (C). The therapeutic apparatus can be used simultaneously with topical creams, lotions, oils and/or salves. The therapeutic apparatus can be used by high performers who require low use time, minimal space/size, and travel.

The therapeutic apparatus can be used for treating many conditions at a relatively low cost (affordability (A)) as opposed to recurring cost for expensive treatments and/or OTC anti-inflammatory drugs, saving the user recurrent expenses (A).

The therapeutic apparatus is tolerant to heat (durability (D)) up to 100 degrees centigrade. Further, the therapeutic apparatus can be used for a very long period e.g., 10 years.

The therapeutic apparatus can be expanded (expandability (E)) to provide fully contiguous connected and personalised expanded coverage to fit any size person regardless of weight or height. Further, the therapeutic apparatus can be designed to fit any body part such as shoulders and elbows, hinged joints, knees, ankles, etc.

The therapeutic apparatus can be reused for a very long period e.g., 10 years (reusable (R)). Therefore, minimizing packaging waste of things like lotion and pill containers making ASHA "green" or environmentally friendly/good for the environment (R)).

The therapeutic apparatus is portable (portability (P)) as it can be fit easily in a briefcase, backpack, gym bag, etc. The therapeutic apparatus is slim and not bulky. As a result, the therapeutic apparatus is easy to store and/or transport.

A person skilled in the art appreciates that the therapeutic apparatus may come in a variety of sizes depending on the need and comfort of the user. Further, different materials in addition to or instead of materials described herein may also be used and such implementations may be construed to be within the scope of the present subject matter. Further, many changes in the design and placement of components may take place without deviating from the scope of the presently disclosed therapeutic apparatus.

In the above description, numerous specific details are set forth such as examples of some embodiments, specific components, devices, methods, in order to provide a thorough understanding of embodiments of the present subject matter. It will be apparent to a person of ordinary skill in the art that these specific details need not be employed, and should not be construed to limit the scope of the subject matter.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the subject matter, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. It is contemplated that additional embodiments are within the spirit and true scope of the disclosed subject matter.

What is claimed is:

1. A therapeutic apparatus, comprising:

a plurality of mats, wherein each mat comprises a top surface, a bottom surface, a plurality of mat pressure point fingers, wherein each mat pressure point finger of the plurality of mat pressure point fingers extends from the top surface of said respective mat of the plurality mats, wherein each mat pressure point finger of the plurality of mat pressure point fingers comprises a base, a shaft and a tip, wherein said shaft tapers outwardly from said base to said tip of each respective mat pressure point finger, and wherein said tip of each respective mat pressure point finger substantially tapers and includes a rounded edge; and a connector connecting said plurality of mats, wherein the connector is elongated and comprising a flat top surface, a bottom surface, a length and a width, wherein the length, the flat top and the bottom surfaces of the connector extending from a first end to a second end of the connector, wherein said connector comprises a plurality of connector pressure point fingers, wherein each connector pressure point of said plurality of connector pressure point fingers extends from the flat top surface of the connector, wherein each connector pressure point finger of the plurality of connector pressure point fingers comprises a base, a shaft and a tip, wherein said shaft of each connector pressure point fingers tapers outwardly from said base to said tip of each respective connector pressure point finger, said connector comprises a top flange and a bottom flange connected by a web, and wherein said top flange and said bottom flange forming a first channel on a first lateral side of the connector and a second channel on a second lateral side of the connector, the web is positioned between the first channel and the second channel, the first channel extends from the first end of the connector to the second end of the connector and the second channel extends from the first end of the connector to the second end of the connector, the first channel and the second channel are positioned between the bottom surface and the flat top surface of the connector, wherein the first channel is configured to receive an end of a first mat of the plurality of mats by having a first portion of the top flange contact the top surface of the first mat and a first portion of the bottom flange contact the bottom surface of the first mat and the second channel is configured to receive an end of a second mat of the plurality of mats by having a second portion of the top flange contact the top surface of the second mat and a second portion of the bottom flange contact the bottom surface of the second mat, wherein the plurality of connector pressure point fingers form a row of connector pressure point fingers that extend along the length of the connector, the flat top surface of connector is positioned higher than the top surface of each mat of the first and second mats, whereby said plurality of mats position side-by-side with the help of said connector exposing said mat pressure point fingers of each mat of the plurality of mats and said row of connector pressure point fingers of said connector to provide a continuous array of pressure point fingers formed by the plurality of mat pressure point fingers and the plurality of connector pressure point fingers, and whereby said plurality of mat pressure point fingers and said plurality of connector pressure point fingers configured to apply pressure to targeted areas of human tissue of a user to treat the targeted areas when a user rests over said plurality of mat pressure point fingers and said plurality of connector pressure point fingers.

2. The therapeutic apparatus of claim 1, wherein said shaft of each mat pressure point finger of the plurality of mat pressure point fingers has a height from said base to said tip of the respective each mat pressure point finger of the plurality of mat pressure point fingers, said height being fractionally greater than the width of said base of the respective each mat pressure point finger of the plurality of mat pressure point fingers.

3. The therapeutic apparatus of claim 1, wherein said base of each mat pressure point finger of the plurality of mat pressure point fingers has a circular cross-sectional shape.

4. The therapeutic apparatus of claim 1, wherein said base of each mat pressure point finger of the plurality of mat pressure point fingers has an oval cross-sectional shape.

5. The therapeutic apparatus of claim 1, wherein said base of each mat pressure point finger of the plurality of mat pressure point fingers has a triangular cross-sectional shape.

6. The therapeutic apparatus of claim 1, wherein said base of each mat pressure point finger of the plurality of mat pressure point fingers has a rectangular cross-sectional shape.

7. The therapeutic apparatus of claim 1, wherein each mat pressure point finger of the plurality of mat pressure point fingers and each connector pressure point finger of the plurality of connector pressure point fingers are substantially rigid.

8. The therapeutic apparatus of claim 1, wherein said base of each mat pressure point finger of the plurality of mat pressure point fingers has a width greater than a width of said tip of the respective each mat pressure point finger of the plurality of mat pressure point fingers.

9. The therapeutic apparatus of claim 1, wherein the bottom surface of each mat of said plurality of mats comprises a groove, wherein said bottom flange comprises a rib formed in each of the first channel and the second channel, and wherein said rib of the respective channel of the first channel and the second channel inserts in said groove of the respective bottom surface of the respective mat of the plurality of mats for locking said plurality of mats with said connector.

10. A method of providing a therapeutic apparatus, said method comprising the steps of:

providing a plurality of mats, wherein each mat comprises a top surface, a bottom surface, a plurality of mat pressure point fingers, wherein each mat pressure point finger of the plurality of mat pressure point fingers extends from the top surface of said respective mat of the plurality of mats, wherein each mat pressure point finger of the plurality of mat pressure point fingers comprises a base, a shaft and a tip, wherein said shaft tapers outwardly from said base to said tip of each respective mat pressure point finger, and wherein said tip of each respective mat pressure point finger substantially tapers and includes a rounded edge;

providing a connector for connecting said plurality of mats, wherein the connector is elongated and comprising a flat top surface, a bottom surface, a length and a width, wherein the length, the flat top and the bottom surfaces of the connector extending from a first end to a second end of the connector, wherein said connector comprises a plurality of connector pressure point fingers, wherein each connector pressure point of said plurality of connector pressure point fingers extends from the flat top surface of the connector, wherein each connector pressure point finger of the plurality of connector pressure point fingers comprises a base, a shaft and a tip, wherein said shaft of each connector pressure point fingers tapers outwardly from said base to said tip of each respective connector pressure point finger, said connector comprises a top flange and a bottom flange connected by a web, and wherein said top flange and said bottom flange forming a first channel on a first lateral side of the connector and a second channel on a second lateral side of the connector, the web is positioned between the first channel and the second channel, the first channel extends from the first end of the connector to the second end of the connector and the second channel extends from the first end of the connector to the second end of the connector, the first channel and the second channel are positioned between the bottom surface and the flat top surface of the connector, wherein the first channel is configured to receive an end of a first mat of the plurality of mats by having a first portion of the top flange contact the top surface of the first mat and a first portion of the bottom flange contact the bottom surface of the first mat and the second channel is configured to receive an end of a second mat of the plurality of mats by having a second portion of the top flange contact the top surface of the second mat and a second portion of the bottom flange contact the bottom surface of the second mat, wherein the plurality of connector pressure point fingers form a row of connector pressure point fingers that extend along the length of the connector, the flat top surface of connector is positioned higher than the top surface of each mat of the first and second mats;

positioning said plurality of mats side-by-side with the help of said connector exposing said mat pressure point fingers of each mat of the plurality of mats and said row of connector pressure point fingers of said connector to provide a continuous array of pressure point fingers formed by the plurality of mat pressure point fingers and the plurality of connector pressure point fingers; and applying pressure to targeted areas of human tissue of a user to treat the targeted areas when the user rests over said plurality of mat pressure point fingers and said plurality of connector pressure point fingers.

* * * * *